United States Patent [19]

Machado

[11] Patent Number: 5,064,458

[45] Date of Patent: Nov. 12, 1991

[54] HEAVY DUTY AIR FILTER WITH MULTIPURPOSE END SEAL

[75] Inventor: Joseph Machado, Attleboro, Mass.

[73] Assignee: Allied-Signal Inc., Morristown, N.J.

[21] Appl. No.: 489,563

[22] Filed: Mar. 7, 1990

[51] Int. Cl.$^5$ .............................................. B01D 50/00
[52] U.S. Cl. ......................................... 55/482; 55/498
[58] Field of Search .......................... 55/337, 482, 498

[56] References Cited

U.S. PATENT DOCUMENTS

| | | | |
|---|---|---|---|
| 3,672,130 | 6/1972 | Sullivan et al. | 55/498 |
| 4,020,783 | 5/1977 | Anderson et al. | 116/114 PV |
| 4,159,197 | 6/1979 | Schuler et al. | 55/379 |
| 4,222,755 | 9/1980 | Grotto | 55/291 |
| 4,261,710 | 4/1981 | Sullivan | 55/96 |
| 4,278,455 | 7/1981 | Nardi | 55/498 |
| 4,304,580 | 12/1981 | Gehl et al. | 55/498 |
| 4,314,832 | 2/1982 | Fox | 55/482 |
| 4,634,458 | 1/1987 | Craig | 55/498 |
| 4,758,256 | 7/1988 | Machado | 55/498 |
| 4,759,783 | 7/1988 | Machado | 55/498 |

Primary Examiner—Jay H. Woo
Assistant Examiner—C. Scott Bushey
Attorney, Agent, or Firm—Ken C. Decker; William N. Antonis

[57] ABSTRACT

An air filter assembly includes a housing, a primary filter cartridge within the housing, and an adapter member in the outlet opening which extends through one end wall of the housing. An annular elastomeric sealing member circumscribes the outlet opening and includes a pair of projecting portions, one of the projecting portions sealing engaging between the housing and the adapter member, and the other projecting portion providing a seal between the housing and the primary cartridge through a axially projecting, circumferentially extending sealing surfaces and also sealing between the secondary backup filter cartridge and the housing through a radially projecting, circumferentially extending sealing surface on the annular elastomeric sealing member.

15 Claims, 1 Drawing Sheet

HEAVY DUTY AIR FILTER WITH MULTIPURPOSE END SEAL

BACKGROUND OF THE INVENTION

This invention relates to a filter for filtering the inlet air of an internal combustion engine.

Heavy duty air filters, such as those used for filtering the combustion air of a relatively large engine such as those used to power heavy duty, over-the-road trucks, are themselves quite large and bulky and often must be located adjacent other vehicle components. Different filter housings, which may differ from one another only slightly, such as by the orientation of the air inlet and outlets, may be required for various vehicles. Although these housings may differ from one another only slightly, they must be separately tooled, manufactured and inventoried. Accordingly, it is desirable to maintain versatility in heavy duty air cleaner housing design. It is also desirable to minimize the number of components, such as seals, which must be used.

SUMMARY OF THE INVENTION

The present invention provides an outlet tube which is separate from the air cleaner housing, and may be oriented so that one or more pressure taps integral with the outlet tube may be oriented in any of several directions. A common seal is also used to seal between the outlet tube and the housing and between the primary and secondary cartridges and the housing. An optional secondary filter cartridge may also be used in addition to the primary filter cartridge to assure that contaminants do not reach the engine induction system during, for example, replacing of the primary cartridge or because the primary cartridge becomes damaged. The present invention permits replacement of the primary and secondary cartridges independently, and also permits a retrofit installation of a secondary cartridge when necessary without removing the primary cartridge. Accordingly, only one air cleaner housing model need be stocked for the same vehicle in which the owner, depending on the way the vehicle is used, may require only a primary cartridge or both a primary and secondary cartridge.

BRIEF DESCRIPTION OF THE DRAWING

These and other advantages of the present invention will become apparent from the following description, with reference to the accompanying drawings, in which.

DESCRIPTION OF THE PREFERRED EMBODIMENT

Figure 1:
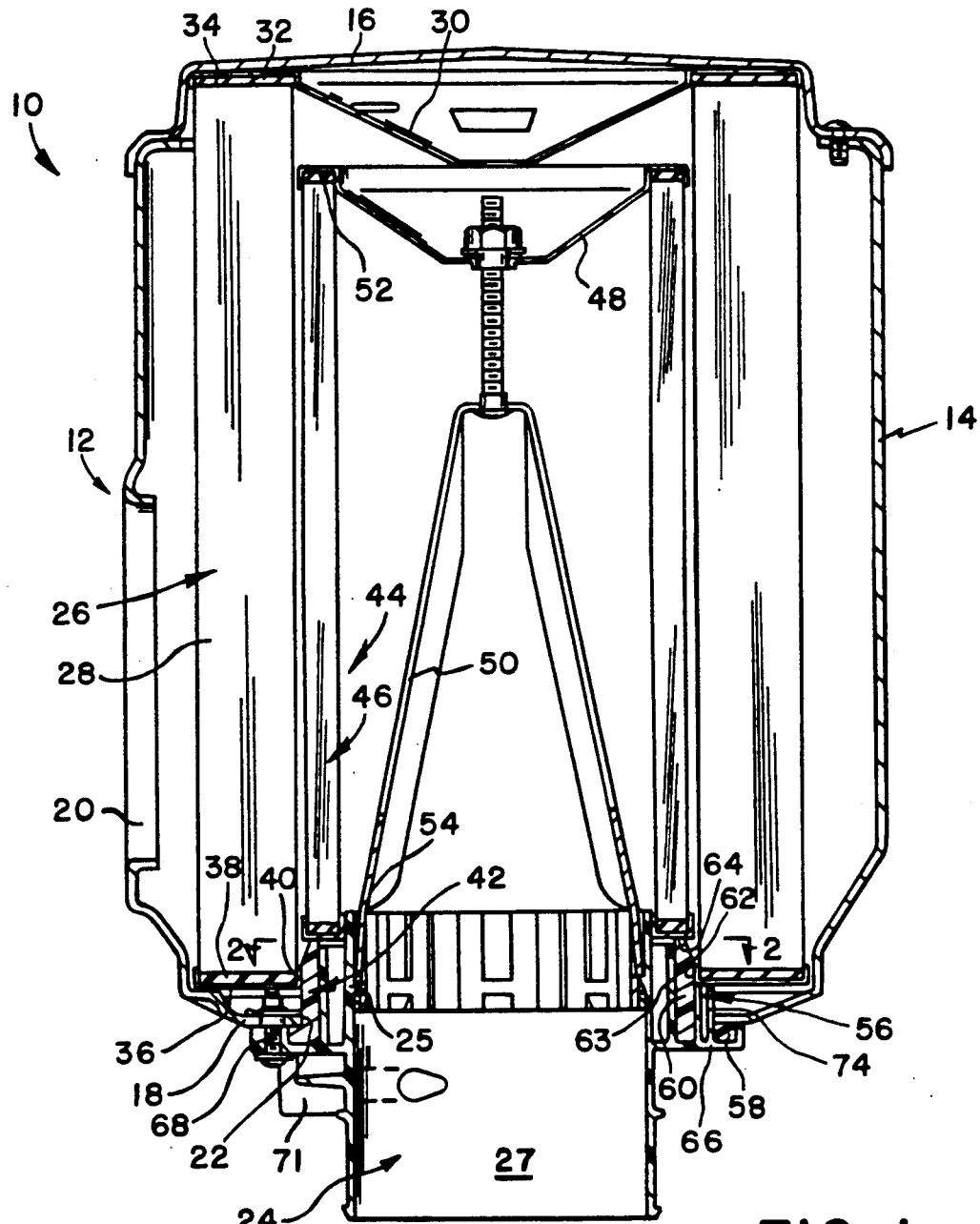
FIG. 1 is a longitudinal cross-sectional view of a heavy duty air filter made pursuant to the teachings of the present invention.
Figure 2:
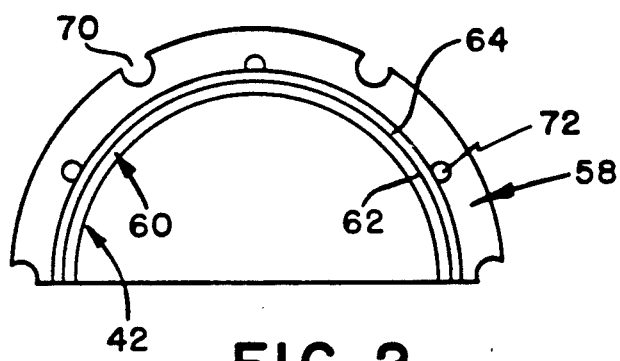
FIG. 2 is a fragmentary top plan view of the seal illustrated in FIG. 1 which seals between the housing member, the adapter member, the primary cartridge, and the secondary cartridge.

Referring now to the drawings, a heavy duty air filter generally indicated by the numeral 10 includes a housing member generally indicated by the numeral 12. Housing member 12 includes circumferentially extending side wall 14 and a pair of end walls 16, 18. An inlet opening 20 is defined in circumferentially extending wall 14, and an aperture 22 is defined in end wall 18. An adapter member 24 is mounted on end wall 18 and includes a projecting portion 25 received within aperture 22. Adapter member 29 defines an outlet opening 27 to facilitate connection with the combustion air intake system of the vehicle upon which the assembly 10 is mounted. Accordingly, the housing member 12 defines a flow path between the inlet opening 20 and outlet opening 27.

A primary filter cartridge generally indicated by the numeral 26 is installed within the housing 12 and filters air as it passes from inlet opening 20 to the outlet defined by adapter member 24. Primary filter cartridge 26 is conventional, and includes a conventional annular array of pleated paper generally indicated by the numeral 28. The upper end of cartridge 26 terminates in a closed end cap 30 which bridges across the open end defined by the annular array of pleated paper 28. Closed end cap 30 includes a circumferentially extending trough portion 32 which receives potting compound 34 which seals the upper edges of the pleats comprising the pleated paper 28. The bottom ends of the pleats comprising the array 28 are sealed in a circumferentially extending, annular end cap 36 which circumscribes the adapter member 24. End cap 36 receives potting compound 38 which seals the lower ends (viewing FIG. 1) of the pleats comprising the array 28. The inner circumferential edge of end cap 36 defines a circumferentially extending, axially projecting sealing surface 40 for sealing against sealing member generally indicated by the numeral 42, which will be described in detail hereinafter. When the filter cartridge 26 is changed, the upper end wall 16 is removed and the cartridge 26 is withdrawn through the upper end (viewing FIG. 1) of the housing 12.

In many applications, the assembly 10 will include only the primary cartridge 26. However, in some applications, it is desirable to minimize the quantity of contaminants that are communicated into the engine air induction system. Accordingly, it has become customary to offer, as an option, a secondary filter cartridge generally indicated by the numeral 44. The secondary filter cartridge 44 comprises an annular array of pleated paper generally indicated by the numeral 46 which is similar to the array 28 but, as can be seen in FIG. 1, the depth of the pleats of the array 46 is much less than the depth of the pleats comprising the array 28. Secondary filter cartridge 44 includes a closed upper end cap 48 similar to the closed upper end cap 30 of the cartridge 26. A bridge 50 is bolted to the upper end cap 48 and is removable received in adapter 24 as more fully described in prior U.S. Pat. No. 4,758,256. Upper end cap 48 includes a circumferentially extending trough receiving potting compound 52 to seal the upper edges of the pleats comprising the array 46. A circumferentially extending end cap 54 circumscribes the lower edges of the pleats comprising the array 46 and carries potting compound for sealing the lower edges of the pleats comprising the array 46.

The multipurpose sealing member generally indicated by the numeral 42 extends circumferentially around the adapter 24 and includes a radially projecting portion 58 and an axially projecting portion 60. Axially projecting portion 60 includes an axially projecting, circumferentially extending sealing surface 62 which sealing engages the sealing surface 40 on the lower end cap 36 of the primary cartridge 26. The adapter member 24 includes a circumferentially extending, axially projecting rim 63 which is substantially coaxial with the sealing surface 40. The other projecting portion 60 of the sealing member 42 is compressed between the rim 63 and the sealing surface 40. Axially projecting portion 60 terminates in a circumferentially extending, radially projecting end portion 64 which sealing engages the lower end cap 54 of the secondary filter cartridge 44, the latter being loaded against the projecting portion 60 of seal 42 by forces applied through the bridge 50.

The radially extending portion 58 of the seal 42 is clamped between radially extending portion 66 of the adapter 24 and the lower end wall 18 of the housing member 12 by circumferentially spaced bolts 68 which extend through apertures 70 which are spaced circumferentially about the radially projecting portion 58. Accordingly, the adapter member 24 can be clamped in any of several circumferential positions relative to the housing member 12 such that the pressure tap 71, which is carried on the adapter member 24, can be located at any of a series of radial positions relative to the housing member 12. This permits easy connection of the pressure tap 71 with the appropriate conduit (not shown).

The radially projecting portion 58 of the seal 42 is also provided with circumferentially spaced apertures 72, which are located radially inwardly with respect to the apertures 70, and which receive circumferentially spaced bosses 74 which extend axially from radially extending portion 66 of the adapter 24. These bosses 74 engage the lower end cap 36 of the primary cartridge 26 to locate the latter axially with respect to the housing member 12. These bosses or their equivalent axial stops cannot easily be provided in the housing member 12 because the latter is designed to be blow molded which does not permit accurate internal features to be molded as a part of the housing member 12.

Normally, air communicated into the inlet opening 20 passes through the primary filter cartridge 26 and secondary or back up filter cartridge 46 and then out of the outlet opening 76 defined by the adapter member 24. As such, the function of the secondary or backup cartridge 44 is to assure, in case the primary filter cartridge is damaged or torn, that unfiltered air containing contaminant particulate matter is never passed directly through the outlet opening 27 to the engine air induction system. Another function served by the secondary or backup filter cartridge 44 is to assure that these contaminants do not pass to the outlet opening 76 while the primary filter cartridge 26 is being changed. Accordingly, the primary cartridge 26 is changed by removing the upper end wall 16 and withdrawing the cartridge through open end of the housing member 12. The primary filter cartridge 26 can be changed while the secondary filter cartridge remains in place.

However, not all installations in which heavy duty filters are used require a secondary filter cartridge. Referring to FIG. 1, it will be noted the aperture 22 has a diameter larger than the outer diameter of the secondary filter cartridge 44, and that the adapter member 24 may be removed by simply removing the bolts 68. Accordingly, air cleaner assemblies may be inventoried and stored which include only the primary filter cartridge 26, and the secondary filter cartridge 44 can be retrofitted or installed in only those applications in which a secondary or backup filter cartridge is required. This may be done even after the housing member 12 has been installed on the vehicle without removal of the primary filter cartridge 26 simply by removing the adapter member 24, installing a bridge and secondary filter cartridge upon the adapter member, and again reinstalling the adapter member on the housing member 12 with the secondary or backup filter cartridge in place.

I claim:

1. Air filter assembly comprising a housing member having a circumferentially extending side wall and a pair of end walls, said housing member having an inlet opening and an outlet opening and defining a flow path between the inlet and outlet openings, primary and secondary coaxial annular filter cartridges within said flow path within said housing member for filtering air communicated between the inlet and outlet openings, one of said openings being located on one of said end walls, and an adapter member separate from said housing member and from each of the primary and secondary filter cartridges, said adapter member being mounted on said one end wall and defining one end wall, and an annular elastomeric sealing member circumscribing said one opening and including a pair of projecting portions, one of said projecting portions sealingly engaging said housing member and said adapter member to provide a seal therebetween, the other projecting portion sealingly engaging each of said filter cartridges.

2. Air filter assembly as claimed in claim 1, wherein said primary annular cartridge includes a circumferentially extending, substantially smooth sealing surface projecting axially with respect to said primary annular cartridge, said other projecting portion of said seal sealingly engaging said sealing surface.

3. Air filter assembly as claimed in claim 2, wherein said adapter member includes a circumferentially extending, axially projecting rim substantially coaxial with said sealing surface, said other projecting portion of said sealing member being compressed between said rim and said sealing surface.

4. Air filter assembly as claimed in claim 3, wherein said one projecting portion extends circumferentially around said housing and adapter members and projects radially with respect thereto, said one projecting portion defining circumferentially spaced openings receiving circumferentially spaced bosses projecting from said adapter member into said housing member to engage said primary annular cartridge to locate the latter within said housing.

5. Air filter assembly as claimed in claim 3, wherein said secondary annular cartridge has a circumferentially extending, radially projecting end surface, said other projecting portion terminating in a circumferentially extending end surface sealingly engaging the end surface of the secondary annular cartridge.

6. Air filter assembly as claimed in claim 1, wherein one of said members includes a circumferentially extending cavity receiving said one projecting portion, the other member defining a sealing surface cooperating with said cavity to sealingly engage said one projecting portion, said fastening means clamping said members together to maintain sealing engagement between said one projecting portion and each of said members.

7. Air filter assembly as claimed in claim 6, wherein said fastening means includes means permitting installation of said one member on the other member in any of a number of circumferential orientations with respect to the other member.

8. Air filter assembly as claimed in claim 1, wherein said other projecting portion extends circumferentially with respect to said primary and secondary cartridges and includes primary and secondary circumferentially extending sealing areas sealingly engaging the primary and secondary cartridges respectively.

9. Air filter assembly as claimed in claim 8, wherein one of said annular cartridges includes a radially projecting, circumferentially extending sealing surface and the other of said annular cartridges includes an axially projecting, circumferentially extending sealing surface.

10. Air filter assembly as claimed in claim 8, wherein said one end wall defines an aperture receiving a portion of the adapter member, the diameter of said secondary annular cartridge is less than the diameter of the aperture and the diameter of the primary annular cartridge is greater than the diameter of the aperture, to thereby permit removal of the secondary cartridge from said housing through said aperture upon removal of the adapter member while the primary annular cartridge remains undisturbed.

11. Air filter assembly as claimed in claim 1, wherein said one end wall defines an aperture receiving a portion of the adapter member, the diameter of said secondary annular cartridge is less than the diameter of the aperture and the diameter of the primary annular cartridge is greater than the diameter of the aperture, to thereby permit removal of the secondary cartridge from said housing through said aperture upon removal of the adapter member while the primary annular cartridge remains undisturbed.

12. Air filter assembly as claimed in claim 1, wherein the other end wall of said housing is removable to permit removal of said primary filter cartridge through the end of the housing member closed by the other end wall, an aperature in said one end wall receiving said adapter member, said aperature being larger than the secondary filter cartridge but smaller than the primary filter cartridge to thereby permit removal of said secondary cartridge through said aperture upon removal of said adapter member.

13. An air filter assembly as claimed in claim 12, wherein said primary annular cartridge includes a circumferentially extending, substantially smooth sealing surface projecting axially with respect to said primary annular cartridge, said other projecting portion of said seal sealingly engaging said sealing surface.

14. An air filter assembly as claimed in claim 13, wherein said adapter includes a circumferentially extending, axially projecting rim substantially coaxial with said sealing surface, said other projecting portion of said sealing member being compressed between said rim and said sealing surface.

15. An air filter assembly as claimed in claim 14, wherein said one projecting portion extends circumferentially around said housing and adapter members and projects radially with respect thereto, said one projecting portion defining circumferentially spaced openings receiving circumferentially spaced bosses projecting from said adapter member into said housing member to engage said primary annular cartridge to locate the latter within said housing.

* * * * *